(No Model.)

W. S. PIPES & F. T. GUIHER.
BICYCLE SUPPORT.

No. 518,698.           Patented Apr. 24, 1894.

Witnesses:
L. C. Hills
E. H. Bond

Inventors:
William S. Pipes,
Frank T. Guiher.
By E. B. Stocking, Attorney

UNITED STATES PATENT OFFICE.

WILLIAM S. PIPES AND FRANK T. GUIHER, OF WAYNESBURG, PENNSYLVANIA.

BICYCLE-SUPPORT.

SPECIFICATION forming part of Letters Patent No. 518,698, dated April 24, 1894.

Application filed October 25, 1893. Serial No. 489,088. (No model.)

*To all whom it may concern:*

Be it known that we, WILLIAM S. PIPES and FRANK T. GUIHER, citizens of the United States, residing at Waynesburg, in the county of Greene, State of Pennsylvania, have invented certain new and useful Improvements in Bicycle-Supports, of which the following is a specification, reference being had therein to the accompanying drawings.

This invention relates to certain new and useful improvements in bicycle supports of that class adapted to be carried upon the frame of the bicycle and to be turned down to support the same when at rest. It has for its objects among others to provide a simple and cheap support which can be readily applied to the frame of any bicycle and which shall add but little to the weight and in no way interfere with the rider.

The improvement embodies a clamp or clasp for attachment to a portion of the frame of the machine and a bar or rod pivoted in said clamp or clasp, the pivot of the rod or bar forming also the means for holding the clasp or clamp. Means are provided for holding the bar or rod in its adjusted position so as to prevent movement of the same either forward or backward and thus prevent the movement of the machine.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1:
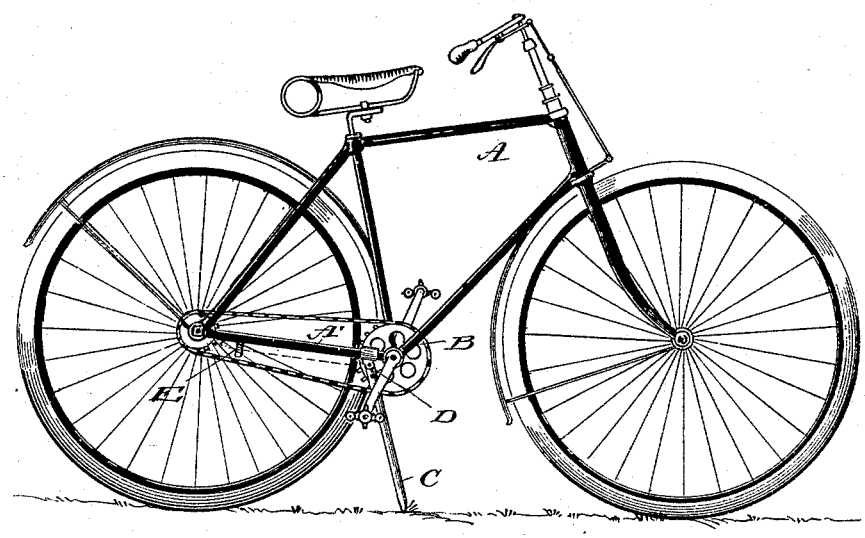
Figure 2:
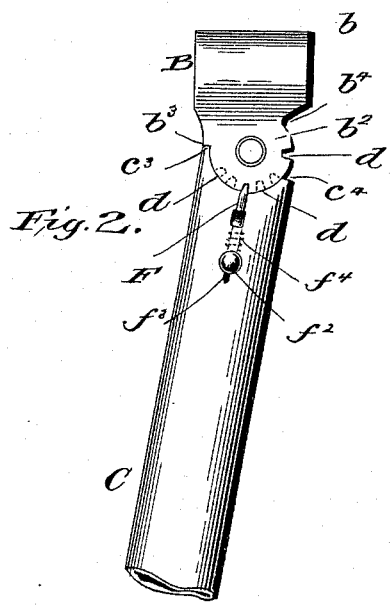
Figure 3:
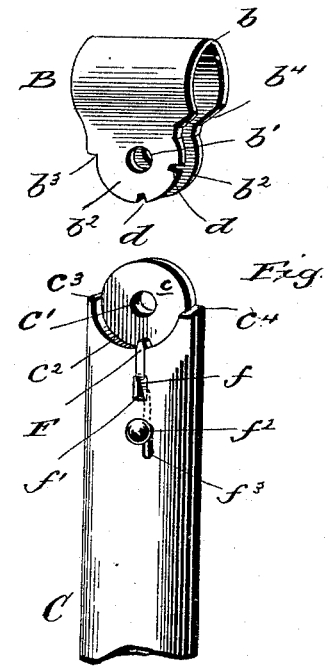

Figure 1 is a side elevation of a bicycle with our improved support attached and shown in its extended position. Fig. 2 is a perspective detail on an enlarged scale of the clasp or clamp and a portion of the rod. Fig. 3 is a perspective detail, also on a larger scale, of the same parts separated.

Like letters of reference indicate like parts throughout the several views.

Referring now to the details of the drawings by letter, A designates a bicycle of any well known construction, to the frame of which our improved support is designed to be affixed. It may be affixed to any desired part of the frame but preferably to the lower bar or portion A' as seen in Fig. 1.

B is a sheet metal clasp or clamp formed of a piece of spring metal bent upon itself to form a portion $b$ to embrace the bar or portion A' of the frame and then the two ends are brought substantially parallel with each other and a hole $b'$ is then formed in these two parallel portions as seen in Fig. 3. Or the holes may be formed at the same time that the blank is formed.

C is a rod or bar which may or may not have a pointed end as is shown in Fig. 1, and the other end is provided with a substantially circular portion $c$ adapted to fit between the parallel portions $b^2$ of the clasp or clamp, and this rod or bar is pivotally held to the clasp or clamp by a transverse bolt or pin D which passes through a hole $c'$ in the circular portion of the rod or bar and through the holes in the portions $b^2$ and held against endwise movement in any suitable manner. It will thus be seen that the bolt or pin which holds the rod or bar pivotally in position also serves to hold the clamp or clasp on the portion of the frame by which it is supported. The rod or bar C is further formed with a recess or cut out portion $c^2$ as seen best in Fig. 3 in which one of the portions $b^2$ of the clamp or clasp B is designed to fit as shown in Fig. 2, and the shoulders $c^3$ and $c^4$ formed at the ends of this recess serve as stops to limit the movement of the rod or bar on its pivot, co-operating with shoulders $b^3$ and $b^4$ on the clamp or clasp B as will be understood from Fig. 2.

In order to hold the rod or bar in its closed or folded position we may provide a spring clasp or holder E of any suitable construction secured to the portion A' of the frame as seen in Fig. 1 and into which the rod or bar is forced and by which it is held.

To hold the rod or bar C in its extended position we provide one of the portions $b^2$ of the clamp or clasp with notches $d$ as seen in Figs. 2 and 3 and which may be more or less in number as may be required. F is a catch or pawl adapted to engage any one of these notches to hold the rod or bar at the desired position with relation to the portion A' of the frame. It is preferable when the pawl is not employed that one of the notches be so located that when the rod or bar is in position to hold the wheel it will incline slightly forward from the perpendicular as shown in Fig. 1 so as to prevent forward movement of the machine the natural tendency of which is to thus move. This pawl has one end somewhat beveled as seen in Fig. 3 to better enable it to enter the notches and is formed with an offset at $f$ so that its other end may enter the rod through a slot $f'$ therein as seen best in Fig. 3 and is provided with a knob or projecting portion $f^2$ by which it may be moved, the shank of the knob working through a slot $f^3$ in the rod, and a spring $f^4$ being provided for normally holding the pawl in engagement with a notch in the clamp or clasp. Normally the rod or bar is held in a position parallel with the portion A' of the frame as shown by dotted lines in Fig. 1; here it is out of the way, but when the rider desires to stop and to leave his machine standing all that it is necessary for him to do is to disengage the end of the rod or bar from the holder E and throw the same into the position in which it is shown by full lines in Fig. 1 when the pawl will spring into the notch and the rod or bar will be firmly held in the position in which it is shown. If it be desired to hold the rod or bar in a position other than that in which it is shown the pawl may be engaged with the desired notch. The rod may be used without the pawl by letting the two shoulders $c^3$ and $c^4$ come in contact with the shoulders of the clamp to hold the rod inclined forward or backward from the center.

What is claimed as new is—

1. The combination with a clamp having a curved portion and substantially parallel depending portions, with shoulders and notches, of a rod or bar pivoted in said depending portions and provided with shoulders and a pawl, as set forth.

2. The combination with a bicycle frame, of a clamp embracing a portion thereof and formed with shoulders and notches, a rod pivotally held between portions of the clamp and formed with shoulders and a curved recess, and a pawl on the rod for engagement with the notches of the clamp, substantially as specified.

In testimony whereof we affix our signatures in presence of two witnesses.

WILLIAM S. PIPES.
FRANK T. GUIHER.

Witnesses:
JAMES THOMAS,
BENJ. FITZGERALD.